United States Patent Office 3,309,285
Patented Mar. 14, 1967

3,309,285
PREPARATION OF 5'-GUANYLIC ACID BY FERMENTATION
Kazuo Uchida, Choshi-shi, Kenkichi Miyauchi, Hasaki-machi, Kashima-gun, and Masao Fujimoto, Choshi-shi, Japan, assignors to Yamasa Shoyu Co., Ltd., Choshi-shi, Japan, a corporation of Japan
No Drawing. Filed July 27, 1965, Ser. No. 475,241
Claims priority, application Japan, Aug. 10, 1961, 36/28,346
1 Claim. (Cl. 195—28)

This application is a continuation-in-part of prior application Ser. No. 214,539, filed on Aug. 3, 1962, in the names of Kazuo Uchida, Kenkichi Miyauchi and Masao Fujimoto, and entitled, "Fermentation Processes," and now abandoned.

This invention relates to fermentation processes for the production of 5'-nucleotides. More particularly, it is concerned with processes for producing 5'-guanylic acid by cultivating bacteria in a medium suitable for growth of the bacteria.

The 5'-nucleotides such as 5'-guanylic acid and 5'-inosinic acid are valuable flavorings useful in small amounts for enhancing the flavor of foods, beverages and seasonings. It has been found that these nucleotides can be produced by the enzymatic degradation of ribonucleic acid. However, this procedure is not particularly suited for the commercial production of nucleotides, because the starting material is expensive and the individual products are difficult to isolate and separate. Accordingly, other methods more suitable for the preparation of the 5'-nucleotides, and in particular 5'-guanylic acid, have been sought.

It is therefore an object of the present invention to provide a method of producing 5'-guanylic acid utilizing inexpensive and readily available raw materials. Another object is to provide a method of preparing 5'-adenylic acid on a commercial scale. Other objects will be apparent from the detailed description of this invention hereinafter provided.

In accordance with the present invention, it is now found that new strains of bacteria isolated from natural sources by means of a screening procedure utilizing a guanine-requiring mutant can be grown in suitable media to produce 5'-guanylic acid either alone or with 5'-adenylic acid. Thus, we have found that 5'-guanylic acid-producing strains of bacteria isolated by our screening procedure can be grown in suitable media containing sources of nitrogen, carbon and essential inorganic salts required by the microorganism to produce 5'-guanylic acid either along or with 5'-adenylic acid. In carrying out the processes of the present invention, different species of bacteria can be used. For example, we have found that strains of bacteria belonging to the genus Kurthia and the new species of genus Bacillus isolated by our screening procedure are useful in producing 5'-guanylic acid and 5'-adenylic acid in accordance with this invention. Also, it has been found out that the most effective range of pH value of the nutrient medium to be used is from 5.6 to 7.2 and that the cultivating time to accumulate the maximum amount of 5'-guanylic acid is from 3 to 8 days, though it varies dependent on the strain to be used and the medium conditions. Thus, our invention provides a convenient method of preparing 5'-guanylic acid and 5'-adenylic acid on a commercial scale from readily available inexpensive raw materials. The 5'-guanylic acid is valuable as flavoring agents and in addition are important metabolic intermediates. The 5'-adenylic acid can be readily converted to 5'-inosinic acid, an important flavorous compound, by treatment with nitrous acid or with adenyl deaminase.

Although considerable research has been devoted for finding methods of preparing nucleotides by direct fermentation, the accumulation of 5'-guanylic acid or mixtures of 5'-guanylic acid with 5'-adenylic acid was not known prior to our invention. We have found that by isolating new strains of bacteria having three specific characteristics from natural sources by means of our screening procedure using a guanine-requiring auxotroph and growing these microorganisms in suitable culture media, 5'-guanylic acid either along or with 5'-adenylic acid can be produced. The characteristics of these strains of bacteria suitable for use in our new process are as follows:

(1) A large amount of 5'-guanylic acid is accumulated by cultivating the strains in suitable media and, depending upon the particular strain of bacteria and the medium employed, 5'-adenylic acid may be concurrently produced. The fact that 5'-nucleotides are produced by the cultivation of these strains of bacteria suggest that these strains may have specific metabolic regulation systems in the purine-biosynthetic pathway. Moreover, it had not been previously known that both 5'-guanylic acid and 5'-adenylic acid could be accumulated in high amounts under the usual culture conditions.

(2) The fact that guanine, adenine, guanosine, adenosine and other degradation products of the 5'-nucleotides are not found in any significant amounts in the broths produced by culturing our microorganisms, suggests that the 5'-nucleotides formed in the cells are excreted and accumulated in the broth without degradation, and that the cells of the strains isolated by the present inventors do not possess a permeability barrier to the nucleotide compounds. In general, the permeability of microorganisms is very selective and nucleosides and other degradation products of the nucleotides are comparatively permeable while the nucleotides are not. In fact, it had been reported that nucleosides and other basic degradation products of the nucleotides were excreted out of the cells. However, in the case of the cultivation of the new microorganisms of this invention, it is found that only the nucleotides are excreted in rather large amounts.

(3) The fact that 5'-guanylic acid and 5'-adenylic acid accumulated in the fermentation broth are not degraded to any significant extent indicates that the new strains producing the 5'-guanylic acid do not enzymatically affect the accumulated nucleotides. This, therefore, is an important characteristic of the strains of the present invention.

In accordance with another embodiment of the present invention, we have found that the particular bacteria suitable for producing 5'-guanylic acid in accordance with this invention can be isolated from natural sources using a guanine-requiring mutant of B. subtilis in the following manner: The isolated bacteria are inoculated on solid media in Petri dishes and the resulting colonies are killed by ultraviolet light irradiation and are covered with a soid medium containing the above-mentioned guanine-requiring mutant of B. subtilis. After culturing, the halo or growth zone of the mutant is examined. The size and thickness of the halo formed around the colony of the bacteria depend upon the quantity of guanine derivatives produced by the particular bacteria. Therefore, the strains of 5'-guanylic acid-producing bacteria suitable for carrying out the present invention are selected based on the size and thickness of the halo formed around the test strain colony. It was found that large amounts of ultraviolet light absorbing substances were accumulated by each strain screened by the above method in a medium containing much more utilizable nutrient sources than those necessary for the growth of the culture in aerated media. The ultraviolet absorption substances were found to contain 5'-guanylic acid either alone or in combination with 5'-adenylic acid. These compounds can be readily isolated from the culture medium and purified in accordance with methods known in the art. Thus, a biosynthetic process for preparing 5′-guanylic acid either alone or together with 5′-adenylic acid has been found.

Brief explanatory notes of some of the main morphological characteristics of the typical useful strains isolated in accordance with this embodiment of our invention are shown in the following table:

| Strain No. | Form of Cell | Spore | Gram Stain |
|---|---|---|---|
| G-408 | Rod | − | + |
| G-409 | Rod | − | + |
| G-416 | Rod | − | + |
| G-478 | Rod | − | + |
| G-620 | Rod | − | + |
| G-845 | Rod | − | + |
| G-847 | Rod | − | + |
| G-1958 | Rod | − | + |
| G-105 | Rod | + | + |
| G-393 | Rod | + | + |
| G-396 | Rod | + | + |
| G-493 | Rod | + | + |
| G-549 | Rod | + | + |
| G-618 | Rod | + | + |
| G-628 | Rod | + | + |
| G-2293 | Rod | + | + |

It has been found that eight strains of the bacteria namely, G-408, G-409, G-416, G-478, G-620, G-845, G-847 and G-1958, shown in the above table represent a new species of Kurthia. The morphological and physiological characteristics of these strains isolated from different sources cannot be found in Bergey's Manual of Determinative Bacteriology, 7th edition. Therefore, these strains are recognized to be a new species. The characteristics on one of these strains, namely, G-620, using the descriptive chart contained in the Manual of Microbiological Methods, 1957, are as follows:

(1) Form of cells 18 hour culture on beef-extract agar at 30° C.—
  (1) Vegetatative cells: Rods 0.8 to 0.9 by 4 to 7 microns, with unbranched, rounded ends, occurring singly, or in pairs and occasionally in chains consisting of three rods.
  (2) Filaments: Formed in usual medium and at a wide range of temperatures. The formation is not inhibited by addition of special nutrients such as biotin. The formed filaments later subdivide into the usual type of vegetative cells. The filaments are about 30 to 300 microns long.
  (3) Motility: Motile.
  (4) Endospores: Not formed.
  (5) Gram stain: Positive.

(2) Agar streak 20 hour culture on beef-extract agar at 30° C.—
  (1) Growth: Abundant.
  (2) Form: Spreading or echinulate.
  (3) Lustre: Dull glistening.
  (4) Chromogenesis: Weak white gray to weak white yellow.
  (5) Odor: Putrid or ammoniacal.
  (6) Consistency: Butyrous or slightly viscid.
  (7) Medium: Unchanged.

(3) Agar colony 48 hour culture on beef-extract agar at 30° C.—
  (1) Form: Circular.
  (2) Surface: Slightly smooth.
  (3) Margin: Lacerate.
  (4) Elevation: Slightly convex.
  (5) Density: Opaque.

(4) Beef-extract broth 24 hour culture on beef-extract broth at 30° C.—
  (1) Surface growth: Forms fragile ring.
  (2) Clouding: Slightly turbid.
  (3) Amount of growth: Moderate.
  (4) Sediment: Slight precipitate, like a cloud.

(5) Physiological characters—
  (1) Liquefaction of gelatin: Rapidly liquefied; stratiform.
  (2) Fermentation of sugars:

| | Acid production | Gas production |
|---|---|---|
| Glucose | − | − |
| Lactose | − | − |
| Sucrose | − | − |

(3) Anaerobic fermentation of glucose: Negative.
  (4) Action on litmus milk:
    pH _____ Alkaline
    Acid curd _____ Negative
    Pennet curd _____ Negative
    Peptonization _____ Positive
    Reduction _____ Negative
  (5) Reduction of nitrate: Negative.
  (6) Production of indol: Negative.
  (7) Production of hydrogen sulfide: Positive.
  (8) Relation to oxygen: Aerobic.
  (9) Temperature:
    Temperature for growth _____ The optimum temperature is near 33° C. No growth at 44° C. Good growth at 20° to 37° C.
    Thermal death point __ 10 minutes at 50° C.
  (10) pH:
    Optimum pH _____ 10.0
    Critical pH for growth ____ 5.0
  (11) Production of chromogenesis:
    On gelatin _____ Marguerite yellow.
    On agar _____ Weak gray white to weak yellow white.
    On potato _____ Warm buff.
  (12) Voges-Proskauer reaction: Negative.
  (13) Methyl red reaction: Negative.
  (14) Utilization of citrate: Positive.
  (15) Utilization of uric acid: Positive.
  (16) Hydrolysis of starch: Scanty.
  (17) Hydrolysis of casein: Positive.
  (18) Urease: Positive.
  (19) Catalase: Positive.
  (20) Accumulation of 5′-guanylic acid (and 5′-adenylic acid): Positive (much accumulation), accumulation of nucleosides or the smaller derivatives of nucleic acids is negative.
  (21) Source: Isolated from a soil.

This strain G-620 is recognized to belong to the family Brevibacteriaceae described in Bergey's Manual of Determinative Bacteriology, 7th edition, because it is a gram-positive unbranched rod, does not form spores, and does not ferment glucose anaerobically. This family is divided into two genera: Brevibacterium and Kurthia. The former consists of short, almost coccoid, unbranched rods, non-filamentous, and usually producing acid from simple carbohydrates. On the other hand, the present strain, G-620, is unbranched, forms long rods and filaments, and does not produce acid from simple carbohydrates. Thus, it is clear that the present strain G-620 does not belong to the genus Brevibacterium but belongs to the genus Kurthia.

According to Bergey's Manual of Determinative Bacteriology, 7th edition, there are three species in the genus Kurthia. One of them, *Kurthia bessonii* is capable of liquefying gelation, but the other two species are not. Since the present strain liquefies gelatin, it is the most similar to *Kurthia bessonii* among three described species of Kurthia. However, the present strain G-620 is different from *Kurthia besonii* in the following two characteristics:

|   |   | *Kurthia bessonii* | G-620 |
|---|---|---|---|
| 1 | Hydrogen sulfide | Not produced | Produced. |
| 2 | Elevation of agar colony | Umbilicate | Umbonate. |

Therefore, the present strain G-620 is recognized to be a new species belonging to the genus Kurthia. The physiological and morphological characters of the other seven strains are almost similar to those of G-620. Therefore, these seven strains, G-408, G-409, G-416, G-478, G-845, G-847 and G-1958, as well as G-620, are recognized to be a new species belonging to Kurthia. Needless to say, the present invention involves the use of this new species belonging to Kurthia.

On the other hand, spore-forming bacteria, G-105, G-393, G-396, G-493, G-549, G-618, G-628 and G-2293 which were isolated from different sources, are found to be a new species belonging to the genus Bacillus. The morphological and physiological characters of these strains cannot be found in Bergey's Manual of Determinative Bacteriology, 7th edition. Therefore, these strains represent a new species. The characters of one strain, G-396, of the new species belonging to Bacillus are described based on the Descriptive Chart in the Manual of Microbiological Methods, 1957, as follows:

(1) Form of cells 20 hour culture on beef-extract agar at 30° C.
   (1) Vegetative cells: Rods 1.0 to 1.3 by 3 to 5 microns on an average, with rounded ends, unbranched, occurring singly, or in pairs. On glucose nutrient agar, the growth is more abundant, the rods are larger, longer, and more vacuolated, and form spindles or wedge shapes more easily than on nutrient agar.
   (2) Motility: Weakly motile.
   (3) Sporangia: Not distinctly swollen.
   (4) Spores: 1.0 by 1.2 microns on an average, oval, central to terminal. Many in 48 hours.
   (5) Gram stain: Positive.
(2) Agar streak 20 hour culture on beef-extract agar at 30° C.—
   (1) Growth: Abundant.
   (2) Form: Smooth, spreading (old cells are wrinkled).
   (3) Lustre: Glistening.
   (4) Chromogenesis: Creamy white to slight yellow.
   (5) Consistency: Butyrous.
   (6) Medium: Unchanged.
(3) Beef-extract broth 48 hour culture in beef extract broth at 30° C.—
   (1) Surface growth: None.
   (2) Clouding: Heavy, uniform turbidity.
   (3) Amount of growth: Abundant.
   (4) Sediment: Moderate.
(4) Agar colony 20 hour culture on beef extract agar at 30° C.—
   (1) Form: Circular.
   (2) Surface: Smooth.
   (3) Margin: Entire.
   (4) Elevation: Convex to raised.
   (5) Density: Opaque.
(5) Soybean agar slant: Growth abundant.
(6) NaCl broth: No growth in 2% NaCl.
(7) Physiological properties—
   (1) Liquefaction of gelatin: Slowly liquefied; infundibuliform.
   (2) Fermentation of sugars (medium of Ayers):

|   | Acid production | Gas production |
|---|---|---|
| Arabinose | − | − |
| Xylose | + | − |
| Glucose | + | − |
| Galactose | + | − |
| Fructose | + | − |
| Sucrose | + | − |
| Mannitol | + | − |
| Lactose | + | − |

(3) Reduction of nitrate: Positive.
   (4) Anaerobic production of gas from nitrate: Positive.
   (5) Voges-Proskauer reaction: Faint positive.
   (6) Methyl red reaction: Positive.
   (7) Utilization of citrate: Positive.
   (8) Hydrolysis of starch: Scant.
   (9) Hydrolysis of casein: Positive.
   (10) Tyrosine agar slant: Unchanged.
   (11) Catalase: Positive.
   (12) Accumulation of 5'-guanylic acid and 5'-adenylic acid: Positive (much accumulation), accumulation of nucleosides or the smaller derivatives of nucleic acid is negative.
   (13) Source: Isolated from a soil.

Peptone-water medium used because G-396 cannot grow in proteose-peptone glucose medium.

This strain G-396 is recognized to belong to the genus Bacillus described in Bergey's Manual of Determinative Bacteriology, 7th edition, because it contains gram-positive, spore-forming, rod-shaped cells which are catalase-positives. Sporangia of this strain G-396 are not distinctly swollen, and vacuoles are present in the protoplasm of young cells if lightly stained. Moreover, the diameter of the vegetative cell is 0.9 micron or more. Accordingly, this strain G-396 is the most similar to *Bacillus megaterium* or *Bacillus cereus*. However, the present strain G-396 is different from *Bacillus megaterium* or *Bacillus cereus* in the following characters.

|   | *Bacillus megaterium* | *Bacillus cereus* | G-396 |
|---|---|---|---|
| Vegetative cells | Normal rod-shaped, not spindle or wedge-shaped. | Normal rod-shaped, not spindle or wedge-shaped. | In young age, normal rod-shaped but in old age, spindle or wedge-shaped cells. |
| Agar colony | Entire and convex or raised | Flat and irregular | Entire and convex or raised. |
| Voges-Proskauer reaction | Negative | Positive | Faint positive. |
| Hydrolysis of starch | Positive | do | Scant. |
| Fermentation of mannitol | do | Negative | Positive. |
| Anaerobic production of gas from nitrate | Negative | Positive | Do. |
| Accumulation of 5'-guanylic and 5'-adenylic acids. | do | Negative | Do. |

Therefore, the present strain G-396 is recognized to be neither *B. megaterium* nor *B. Cereus*, but to be a new species belonging to the genus Bacillus. This strain is capable of accumulating both 5'-guanylic and 5'-adenylic acids under the appropriate conditions.

The physiological and morphological characters of the other seven strains, G-105, G-393, G-493, G-549, G-618, G-628 and G-2293 are almost similar to those of G-396. Therefore, these seven strains as well as G-396 are recognized to be a new species belonging to the genus Bacillus. Needless to say, the present invention involves the use of this new species belonging to Bacillus.

Cultures of these newly isolated strains of Kurthia species and Bacillus species have been deposited with the American Type Culture Collection at Washington, D.C. and added to its culture collection as ATCC 14757 and ATCC 14758 respectively.

The following examples illustrate the methods of carrying out the processes of the present invention.

Example 1

G-396, a strain of a new species of Bacillus isolated from the soil, was cultivated with shaking in a medium consisting of the following components per liter of medium:

| | |
|---|---|
| $K_2HPO_4$ | 7.0 g |
| $KH_2PO_4$ | 3.0 g |
| $(NH_4)_2SO_4$ | 1.0 g |
| $MgSO_4 \cdot 7H_2O$ | 0.2 g |
| Sodium citrate | 0.5 g |
| Casein hydrolystate | 10.0 g |
| Glucose | 20.0 g |
| Thiamine | 100γ |
| Riboflavin | 100γ |
| Pyridoxine | 200γ |
| Ca-pantothenate | 20γ |
| Nicotinic acid | 20γ |
| p-Aminobenzoic acid | 1γ |
| Biotin | 0.5γ |

After four days' culture at 28° C., the cells were removed and the 5'-guanylic and 5'-adenylic acids were obtained from the cultured medium in accordance with methods known in the art. The yields were as follows:

| | |
|---|---|
| Initial pH | 6.8 |
| Final pH | 6.0 |
| 5'-guanylic acid, mg./100 ml. | 20.6 |
| 5'-adenylic acid, mg./100 ml. | 17.6 |

Example 2

G-2293, a strain of a new species of Bacillus isolated from the soil, was cultivated with shaking in the same medium described in Example 1. After three days' culture at 28° C., 5'-guanylic and 5'-adenylic acids were obtained from the cultured medium in accordance with known methods. The yields were as follows:

| | |
|---|---|
| Initial pH | 6.5 |
| Final pH | 5.6 |
| 5'-guanylic acid, mg./100 ml. | 25.3 |
| 5'-adenylic acid, mg./100 ml. | 23.8 |

Example 3

G-493, a strain of a new species of Bacillus isolated from the soil, was cultivated with shaking in the same medium described in Example 1. After three days' culture at 28° C., 5'-guanylic acid was obtained from the cultured medium treated by known methods. The yield was as follows:

| | |
|---|---|
| Initial pH | 6.8 |
| Final pH | 5.4 |
| 5'-guanylic acid, mg./100 ml. | 15.2 |

Example 4

The new species of Kurthia, G-620, isolated from the soil, was cultivated with shaking in a medium consisting of 80 g./l. of glucose, 20 g./l. of casein hydrolysate, and other components which are the same as described in Example 1. After five days' culture at 28° C., 5'-guanylic and 5'-adenylic acids were obtained from the cultured medium by known methods. The yields were as follows:

| | |
|---|---|
| Initial pH | 7.0 |
| Final pH | 5.8 |
| 5'-guanylic acid, mg./100 ml. | 48.1 |
| 5'-adenylic acid, mg./100 ml. | 85.3 |

Example 5

The new species of Kurthia, G-620, which was employed in Example 4, was cultivated with shaking in a medium consisting of 10 g./l. of casein-hydrolysate, 80 g./l. of glucose, 0.4 g./l. of $MgSO_4 \cdot 7H_2O$, and other components, which are the same as described in Example 1. After seven days' culture at 28° C., only 5'-guanylic acid was obtained from the cultured medium by the usual methods. The yield was as follows:

| | |
|---|---|
| Initial pH | 6.8 |
| Final pH | 5.8 |
| 5'-guanylic acid, mg./100 ml. | 10.3 |

Example 6

The new species of Kurthia, G-1958, which was isolated from soil, was cultivated with shaking in the same medium as employed in Example 4. After six days' culture at 28° C., 5'-guanylic and 5'-adenylic acids were obtained from the cultured medium by the usual methods. The yields were as follows:

| | |
|---|---|
| Initial pH | 6.8 |
| Final pH | 5.8 |
| 5'-guanylic acid, mg./100 ml. | 50.5 |
| 5'-adenylic acid, mg./100 ml. | 82.3 |

Example 7

The new species of Bacillus, G-396, which was employed in Example 1, was cultivated with shaking in a medium consisting of 5 g./l. of peptone, 5 g./l. of succinic acid, 7.353 g./l. of $(NH_4)_2HPO_4$, 0.493 g./l. of $MgSO_4 \cdot 7H_2O$, 1.49 g./l. of $KCl$, 0.147 g./l. of $CaCl_2 \cdot 2H_2O$, 40 g./l. of glucose and 1 liter of soybean extract solution, which was employed as the solvent of this medium. The soybean extract solution was prepared as follows: 5 g./l. of defatted soybean was extracted with 100 ml. of 0.1% NaOH solution in boiling water bath for one hour and the resulting supernatant liquid was diluted to 1 liter with distilled water. After eight days culture at 28° C., 5'-guanylic acid was obtained from the cultured medium by the usual methods. The yield was as follows:

| | |
|---|---|
| Initial pH | 7.2 |
| Final pH | 5.8 |
| 5'-guanylic acid, mg./100 ml. | 13.7 |

What we claim is:

A process for the production of 5'-guanylic acid which comprises growing Kurthia ATCC 14757 in an aqueous nutrient medium consisting of:

| | |
|---|---|
| Glucose | 80 g./l. |
| Casein hydrolysate | 20 g./l. |
| $K_2HPO_4$ | 7.0 g |
| $KH_2PO_4$ | 3.0 g |
| $(NH_4)_2SO_4$ | 1.0 g |
| $MgSO_4 \cdot 7H_2O$ | 0.2 g |
| Sodium citrate | 0.5 g |
| Thiamine | 100γ |
| Riboflavin | 100γ |
| Pyridoxine | 200γ |
| Ca-pantothenate | 20γ |
| Nicotinic acid | 20γ |
| p-Aminobenzoic acid | 1γ |
| Biotin | 0.5 | at an initial pH of from 6.8 to 7.2 under aerobic conditions for a period of from 3 to 8 days to excrete and accumulate 5'-guanylic acid in the medium at an acid pH and recovering said guanylic acid from said medium.

References Cited by the Examiner

UNITED STATES PATENTS 3,139,385 6/1964 Ogata et al. _____ 195—28
3,168,446 2/1965 Omura et al. _____ 195—28

OTHER REFERENCES

Bergy's Manual of Determinative Bacteriology, seventh ed., pp. 503–505.

Okabayaski et al.: Chem. Pharm. Bull. (Japan), vol. 8, pp. 370–372 (1960).

Rosano et al.: Biochem. Biophys. Acta, vol. 37, pp. 380 to 382 (1960).

A. LOUIS MONACELL, *Primary Examiner.*

ALVIN E. TANENHOLTZ, *Examiner.*